F. L. O. WADSWORTH.
CONSTRUCTION OF VEHICLE TIRES.
APPLICATION FILED OCT. 17, 1911.
1,111,419.                                   Patented Sept. 22, 1914.
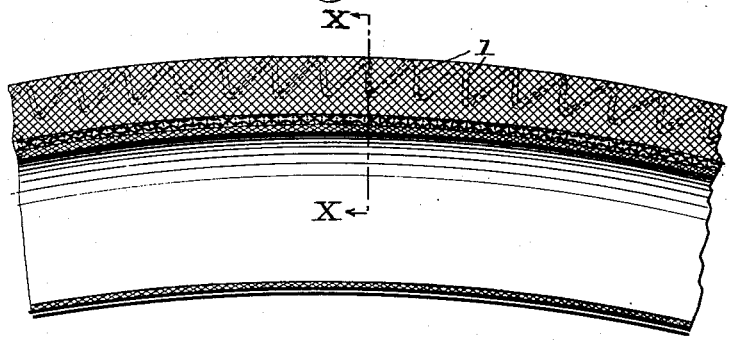
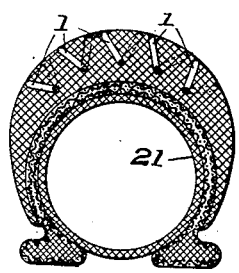
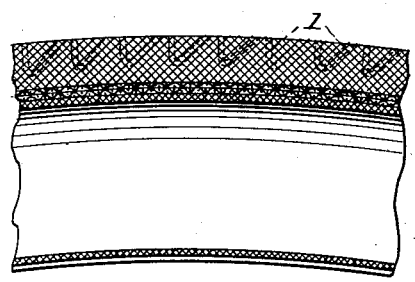
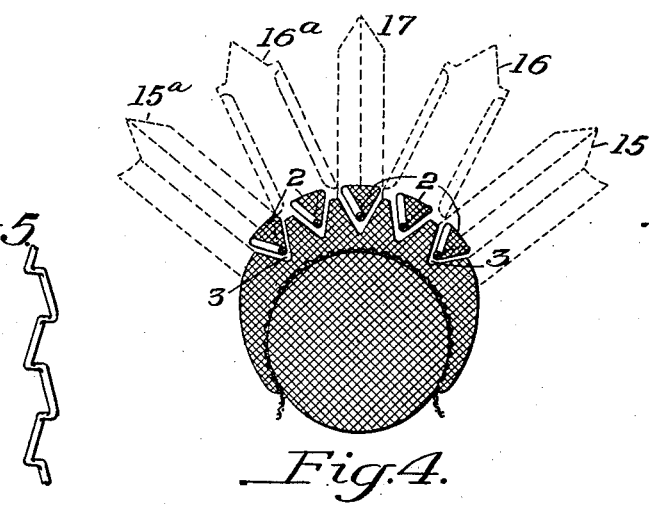

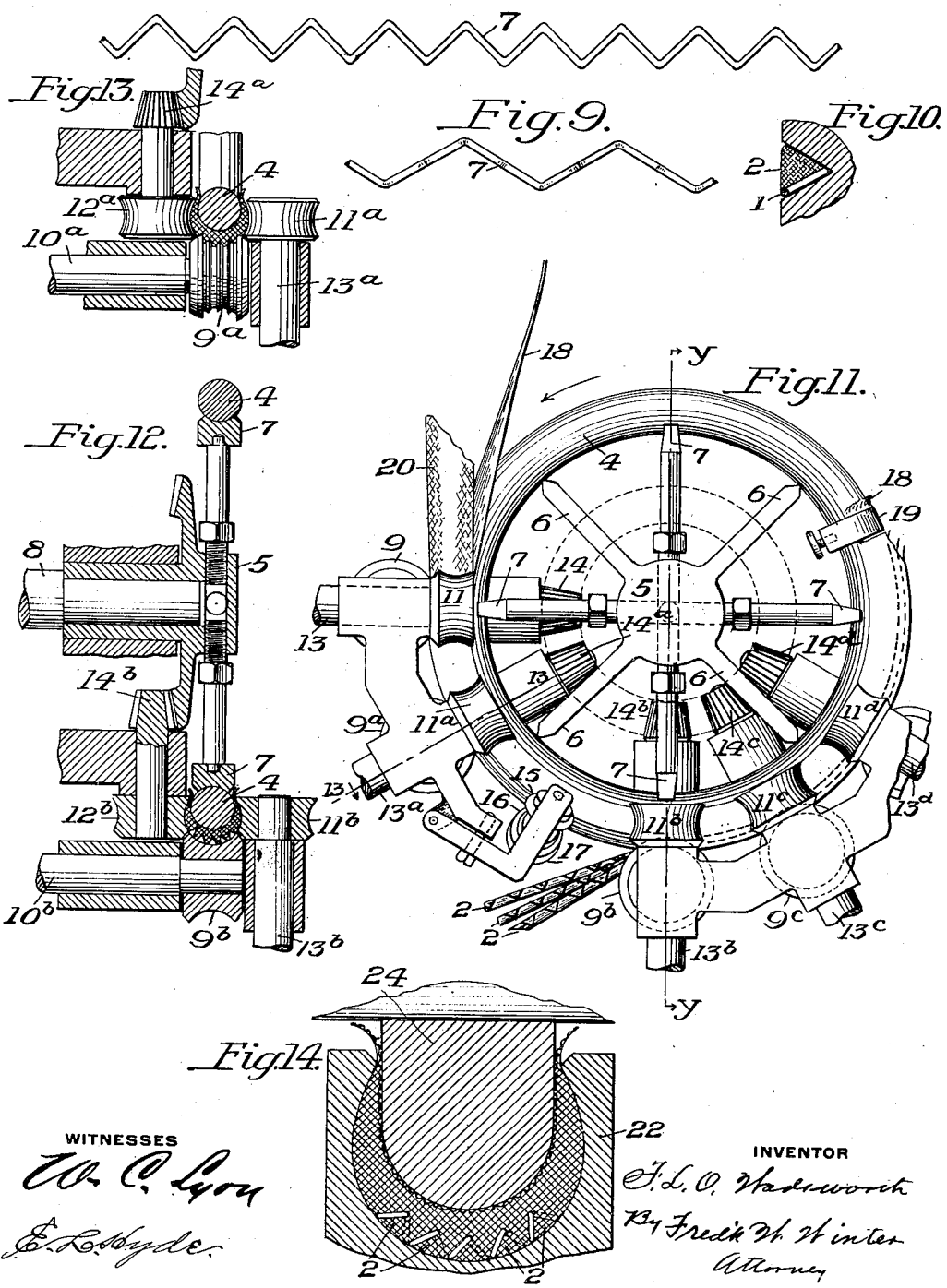

UNITED STATES PATENT OFFICE.

FRANK L. O. WADSWORTH, OF SEWICKLEY, PENNSYLVANIA.

CONSTRUCTION OF VEHICLE-TIRES.

1,111,419.	Specification of Letters Patent.	Patented Sept. 22, 1914.

Application filed October 17, 1911. Serial No. 655,238.

*To all whom it may concern:*

Be it known that I, FRANK L. O. WADSWORTH, a resident of Sewickley, in the county of Allegheny and State of Pennsylvania, have invented certain new and useful Improvements in the Construction of Vehicle-Tires, of which the following is a specification.

My invention relates to the construction of tires for wheeled vehicles, particularly of that class which is motor driven; and the particular object of my invention is to provide a yielding and resilient tire which will prevent the wheel on which it is placed both from slipping when power is applied to it and from skidding or sliding laterally on smooth or wet roadways. I accomplish this object by providing the tire with a tread of rubber or analogous material and embedding therein a series of rows of stiff spring wire bent to form a succession of triangular folds in such manner that the wire forms when so embedded present a series of points lying substantially flush with the outer portion of the tread and an intermediate series of parts which are completely covered and buried within the tread material. I thus obtain a tread surface which presents a series of hard metal sections meeting the surface of the tire—and the surface of the road on which the tire rests—at a considerable angle, so that these metallic sections will act like a series of ratchet teeth in gripping the road surface and preventing the slipping or sliding of the tire in any direction thereon.

A further object of my invention is to obtain a composite tread construction of the character just referred to in which the different parts of the wire insertions will be securely held in the rubber or other tread material until the tire has been completely worn out.

A still further object of my invention is to simplify the construction of this class of tires, to decrease the difficulty of embedding the wire forms in the tread material, and to reduce the cost of manufacture.

Other objects and advantages of my improved construction will appear from the following descriptions of structures and methods of manufacture which I present as illustrative embodiments of my invention.

In the drawings which form a part of this specification, Figure 1 illustrates in partial circumferential cross-section a composite rubber-wire tread construction formed in accordance with my invention; Fig. 2 illustrates a transverse cross-section of the same on the line X—X of Fig. 1; Fig. 3 is a view showing in cross-section the construction of Fig. 1 after the outer surface of the tire has worn away to a certain degree; Fig. 4 is a cross-sectional view indicating the manner in which the wire and rubber portions of the composite tread are assembled in position to form the finished structure; Fig. 5 is a plan view showing one of the wire forms alone; Figs. 6 and 7 are cross-sectional views of different kinds of wire which may be used; Fig. 8 is a side view of another form of wire insertion; Fig. 9 is a plan view of the same; Fig. 10 is an end view, also showing in cross-section the manner in which the space between the bent sides of each wire form is filled with tread material preliminary to the assembling of the parts which form the finished structure; Fig. 11 is a diagrammatic side view of a machine adapted to carry out my method of assembling the parts of my improved structure; Fig. 12 is a cross-section on the line Y—Y of Fig. 11; Fig. 13 is a cross-section on the line 13—13 of Fig. 11; and Fig. 14 is a cross-sectional view also illustrating my improved method of the assembly of the different parts.

The same reference numerals indicate the same or corresponding parts in the different drawings.

In my improved construction the wire parts, which are indicated by the reference numeral 1 are formed by first bending a wire longitudinally so as to produce a succession of triangular folds such as are shown in Fig. 1 or Fig. 8. This may be readily done by passing the wire between two wheels provided with intermeshing teeth of the triangular form required, these teeth being separated a sufficient distance to allow for the passage of the wire between them. The wire form thus obtained is next subjected to an operation by which the successive alternate folds or loops are bent sidewise in opposite directions so as to present, when viewed endwise the form shown in Figs. 2, 4 and 10 and to present when viewed in plan the outline shown in Figs. 5 or 9, and which produces a long, hollow wire structure open continuously from end to end along one side. As a next step in the operation I fill the triangular space or opening between the oppositely bent folds or loops with tread material so as to obtain a strip such as is indicated at 2. This operation can be readily performed by laying the wire form in a grooved block (see Fig. 10), filling the portion of the groove not occupied with the wire with the rubber or other flexible material used in the tread by inserting it through the open side of the wire structure, and then rolling the material down until it completely surrounds the wire forms and produces a composite strip which can be handled as a unit. The strip thus obtained being of a solid triangular form in cross-section can be easily handled, and when laid on its side it will readily retain the position in which it is placed. As a next step in the formation of the completed structure I mold raw plastic rubber or other suitable tread material to such a form as is shown in cross-section in Fig. 4 (which represents the tread portion of an automobile tire) and form in the outer portion of this section a series of triangular grooves 3 ... 3 of suitable form to receive the strips 2 ... 2. The main tread section is preferably built up on a form or mold ring 4, and the grooves 3 ... 3 may be formed in the outer surface of the tread by means of a series of grooving or "stitching" wheels, which are indicated in dotted lines in Fig. 4. I next assemble the parts to form the completed tire by laying the strips 2 ... 2, in the grooves 3 ... 3, and compacting the whole into a unitary structure first by pressure and then by subsequent "curing" or vulcanizing in case rubber is used as tire material. In this latter case I prefer to increase the adhesion between the rubber and the wire parts by copper plating or silver plating the latter so as to form on vulcanization a layer of copper or silver sulfid between the metal and the rubber. This also serves to protect the metallic parts from oxidation in the subsequent use of the tire. The adhesive effect between the rubber and the wire may also be increased, if desired, by using wire of the cross-sectional form shown in Figs. 6 and 7; and this form of wire has the further advantage of being more easily bent to form sharp pointed folds, while retaining the same strength as ordinary round wire.

The completed structure which is shown in Figs. 1 and 2, presents, as will be readily seen, a series of metallic portions which meet the surface of the tire at an acute angle when viewed in either circumferential or transverse cross-section. These portions act like ratchet teeth to dig into and grip any surface with which the tread of the tire may be in contact and to thus prevent any slip or sliding between the two contacting surfaces. In the form of wire insertion shown in Fig. 1, this ratchet tooth action is accentuated in one circumferential direction by making each triangular fold substantially of the form of a right angled triangle; and in this case the wire forms are generally inserted in the tread in such position that the longer side of the triangle points in the direction in which the wheel normally revolves. In the form of wire insertion shown in Figs. 8 and 9 the angularly bent portions of the wire are symmetrically disposed with respect to the tread surface so as to obtain the same gripping action in both circumferential directions. The bending of the successive triangular folds in opposite lateral directions makes the sides of these folds meet the surface of the tire at such an angle (as shown in Fig. 2) that there will be a ratchet tooth action in preventing the sliding or skidding of the tire in either direction at right angles to the circumferential line of travel. As the surface of the tire wears away the extreme outer points of the triangular folds will be also worn away, so that the wire insertions assume the form of separated triangular staples as shown in Fig. 3. But this in no way decreases the gripping action, in fact it rather tends to increase it. The triangular form of the fold prevents any loosening of the now separated parts of the wire insertions, and by virtue of this triangular form the amount of rubber or tire material covering the metallic portions is always proportional to the length of such portions remaining in the tread.

In Figs. 11 and 12 I have shown somewhat diagrammatically a machine for carrying out the method of tire construction which has been already described. In this machine the circular mold or form 4 is centered on a rotating frame 5 by means of arms 6, 6 and is secured thereto by radially movable clamp blocks 7, 7. The frame 5 is mounted on a shaft 8 supported in suitable bearings and driven either by hand or by power, as may be desired. A series of sets of molding or forming rollers are arranged adjacent to the periphery of the circular tire form 4 in such position thereto that the space between the rollers and surface of the said form is just sufficient to admit the necessary material to form the completed structure. Each set of these rollers preferably consist of an initial former, 9, mounted on a shaft, 10, which is parallel to the shaft 8, and two lateral formers 11 and 12 mounted on shafts 13 and 14 which are at right angles to the shafts 8 and 10. These various shafts may be connected by suitable gearing—not shown—with the shaft 8 so that the mean peripheral speed of the surfaces of all the rollers is substantially the same as the mean peripheral speed of the adjacent parts of the mold ring 4. In the first two sets the central rollers 9 and 9ª are provided with shallow ribs corresponding in position to the parts of the tire in which the triangular strips 2 ... 2 are to be located, and just in front of these two sets I place a series of grooving or "stitching" wheels 15, 16, 17, 16ª, and 15ª which have the form and position indicated by dotted lines of Fig. 4, and which are adapted to deepen and complete the grooves formed in the tire material by the corresponding ribs on the two preceding rollers 9 and 9ª. Following this set of grooving or "stitching" wheels I arrange a series of sets of molding wheels 9ᵇ, 11ᵇ, 12ᵇ; 9ᶜ, 11ᶜ, 12ᶜ; etc., all of whose surfaces are plain. In the formation of the tire I first secure the end of a strip of canvas 18 to the mold ring 4 by means of a thin sheet metal clamp 19—or in any other desired manner—and then by the rotation of the mold ring in the direction of the arrow, I lead this strip together with a strip or strips 20 of the raw tire material under the first set of molding rollers 9, 11 and 12. These rollers together with the following set of rollers 9ª, 11ª, and 12ª mold the tire material to the general form required on the canvas base 18 and the mold ring 4. The shallow grooves formed by the ribs in the rollers 9 and 9ª are next deepened and completed by the passage of the molded section under the "stitching" wheels 15, 16, 17, 16ª and 15ª, so that the tire section now presents the appearance shown in the lower portion of the section of Fig. 4. As this section passes under the rollers 9ᵇ, 11ᵇ, and 12ᵇ, the triangular strips 2, 2, 2, ... which have been previously built up in the manner already described, are led into the grooves 3, 3, 3, ... and are rolled down into those grooves and united to the base of the tire section by the pressure of the forming roller 9ᵇ. The action of the succeeding sets of rollers 9ᶜ, 11ᶜ, 12ᶜ; 9ᵈ, 11ᵈ, 12ᵈ; etc.—which may be as many in number as required—serves to complete and perfect the union between the parts of the tire structure and impart to it its final form and outline. As this action generally results also in a certain amount of densification of the tire material each set of rollers is preferably arranged so that the space between their molding surface and the mold ring 4 is gradually reduced; and the frames which support these rollers may also, if desired, be mounted on stiff spring supports so that there will be a steady and definite pressure always exerted on the tire material even though the amount of that material may vary slightly by reason of small irregularities in the supply of such material to the initial set of rollers 9, 11, and 12, or by reason of small differences in the cross-sections of the strips 2 ... 2. When the rotation of the mold frame carrying the ring 4 has brought the initial end of the tread section to a position just in advance of the first set of molding rollers, the clamp 19 is removed, the strips 18 and 20 are cut off at such points as will complete the lap between the initial and final ends of the section, and the rotation of the frame and form ring 4 is continued until the triangular strips 2— which are similarly cut off to the proper lengths—have been embedded up to the point where the ends of the tire section overlap. The frames carrying the molding rollers 11, 11ª, 11ᵇ, etc., and 12, 12ª, 12ᵇ etc., and the frames carrying the "stitching" wheels 15 to 15ª, are then moved laterally away from the mold ring 4; the frame carrying the said ring 4 is lifted away from the supports for the rollers 9, 9ª, 9ᵇ, etc.; the mold ring 4 is removed from its supporting frame by retracting the clamp blocks 7, and the said ring and completed tire formed thereon is wrapped and prepared for final treatment in the curing or vulcanizing chamber in the usual manner. Or if desired the completed tire may be removed from the mold ring 4 and placed on a second ring which carries the canvas or other base 21 (see Fig. 2) and the two parts, tread and base, vulcanizing together at one operation.

If the completed tire or the tread has a section other than that shown in Figs. 2 or 4 the form of the mold ring 4 and the form and arrangement of the molding wheels 9, 11, 12, etc., is of course correspondingly varied.

In Fig. 14 I show diagrammatically another way in which my general method of assembling the tire parts may be carried out. In this case the triangular strips 2 ... 2, are first cut to length, and laid side by side in a concave circular mold form 22, of the size and cross-section required for the finished tread; and the raw rubber or other tread material is then rolled down upon and over these strips by means of one or more wheels 24. In this illustration of my method for tire manufacture the advantage of first forming the composite strips 2 ... 2 in triangular form is rendered very obvious; since with this form of strip there is no tendency to displacement when the body of the tread material is rolled in place, and there is no difficulty in completely filling the spaces between the strips and obtaining a final completed structure which is perfectly free from cavities or parts of less density than is desired.

The great advantages of my improved construction, both as regards the structure itself and as regards the method by which that structure is produced will now be readily apparent to those skilled in the art, and it will be also apparent that various minor changes may be made both in the forms of the wire insertion and in the manner in which the wire elements are incorporated in the tread material without departing from my invention.

I have not attempted to illustrate in detail all of the mechanical features of the machines or devices by which I may carry out my method and produce the articles herein described, because those machine details do not form any part of the invention which I have disclosed and which I claim herein.

What I claim is:

1. The method of manufacture of composite vehicle tires of the kind described which consists in first bending wire to form a series of triangular folds which are alternately spread laterally in opposite directions, filling the grooves or spaces between the alternately spread folds with plastic tread material so as to form composite strips of solid cross-section and then embedding these strips in the body of the tire material and shaping the assembled parts to the final form required substantially as described.

2. The method of manufacture of composite anti-slipping vehicle tires which consists in first forming composite strips of solid cross-section having a central core of plastic material embraced on two sides by oppositely bent wire folds, next shaping a body of tread material with grooves to receive the said composite strips, and then bringing said strips and grooved tread body together and molding the whole to the final form required substantially as described.

3. The method of manufacturing composite wire-rubber vehicle tires which consists in first bending wires to form a series of triangular folds which are alternately spread laterally in opposite directions, filling the grooves between the alternately spread folds with plastic rubber so as to form composite wire-rubber strips of solid cross-section, then embedding these strips in a body of plastic tire material suitably grooved to receive them and shaping the assembled parts to the final form required, and then vulcanizing the assembled parts to form one integral whole.

4. The method of manufacture of vehicle tires of the kind described which consists in first forming composite wire-rubber strips of solid cross-section, having wire folds exposed on two side surfaces thereof and then embedding said strips in a body of plastic tread material in such manner that parts of the wire are substantially flush with the surface of the assembled structure and the intermediate parts are completely embedded therein substantially as described.

5. The method of manufacture of composite wire-rubber vehicle tires which consists in first metal plating stiff wires, bending said wires to form a series of triangular folds which are spread alternately in opposite lateral directions, filling the spaces between such alternately spread folds with plastic tread material so as to form solid composite rubber-wire strips, embedding said composite strips in a body of plastic tire material, shaping the assembled parts to the final form required, and then subjecting the molded structure to a vulcanizing action, and thereby forming a layer of sulfid of the plating material between the wire and tread material.

6. The method of making composite vehicle tires, which consists in bending wire to form an elongated hollow structure open along one side from end to end, filling the space within said structure through the open side thereof with plastic tread material, embedding the strip thus formed in the body or tread of the tire, and shaping the tire to the final form required.

7. The method of making composite vehicle tires, which consists in bending wire to form an elongated hollow structure open along one side from end to end, filling the space within said structure through the open side thereof with plastic tread material, embedding the strip thus formed in the body or tread of the tire with the open side of the wire structure facing outwardly, and shaping the tire to the final form required.

In testimony whereof, I have hereunto set my hand.

FRANK L. O. WADSWORTH.

Witnesses:
F. W. WINTER,
MARY E. CAHOON.